United States Patent
Van Over

(10) Patent No.: US 7,100,598 B2
(45) Date of Patent: Sep. 5, 2006

(54) STEAMING DEVICE AND SYSTEM FOR RESIDENTIAL OVENS

(76) Inventor: Charles Van Over, 49 Ferry Rd. P.O. Box 449, Chester, CT (US) 06412-0449

( * ) Notice: Subject to any disclaimer, the term of this patent is extended or adjusted under 35 U.S.C. 154(b) by 0 days.

(21) Appl. No.: 10/642,012

(22) Filed: Aug. 15, 2003

(65) Prior Publication Data

US 2005/0034718 A1 Feb. 17, 2005

(51) Int. Cl.
*F24C 14/00* (2006.01)

(52) U.S. Cl. ...................................................... 126/369
(58) Field of Classification Search ............... 126/20, 126/25 R, 369; 99/467, 481; 219/496, 494
See application file for complete search history.

(56) References Cited

U.S. PATENT DOCUMENTS

| | | | | | |
|---|---|---|---|---|---|
| 4,495,932 | A | * | 1/1985 | Bratton | 126/20 |
| 4,922,079 | A | * | 5/1990 | Bowen et al. | 219/415 |
| 6,347,578 | B1 | * | 2/2002 | Yung | 99/468 |
| 2003/0178411 | A1 | * | 9/2003 | Manganiello et al. | 219/496 |
| 2004/0000541 | A1 | * | 1/2004 | Veltrop et al. | 219/401 |

FOREIGN PATENT DOCUMENTS

DE 298 02 376 * 6/1998

* cited by examiner

Primary Examiner—Stephen Gravini

(57) ABSTRACT

A steamer device and system for a residential oven is shown for creating steam for the purpose of baking having a steamer insert having a bottom surface for resting on a rack in the oven, the steamer insert having, in sequence, a first chamber, a dam device and a second chamber; and the dam device having a metering hole such that when water is added to the first of the two chambers it can only reach, and does reach, the second chamber through the metering hole. The first and second chambers are angled such that gravity assists in the feeding of water when added from the first chamber through the metering hole to the second chamber. The metering hole is between ⅛ inch and 1/64 inch in diameter. Sloped side walls proximately located to the first and second chambers assist in the gravity feed. Also shown is a system for baking bread, in which the following steps occur: (a) the baking surface stone (like corderite or ceramic) is placed on a first rack in a residential oven; (b) the steamer insert is placed in the oven such that access to the first chamber can occur; (c) the oven is preheated to the optimum temperature (e.g., 410° F. and 475° F.) (and in this manner both the stone and the steamer insert have reached the ambient temperature as well); (d) about ¾ of a cup of water is placed in the first chamber; (e) the bread is then placed on the stone; (f) the oven door is closed. In this manner, the water will trickle through the metering hole into the second chamber, steam the entirety of the oven, the bread will bake, the oven will dry (additional water can thereafter be added for the carmelization effect discussed above), and the bread is allowed to bake for a period of time known to one of ordinary skill in the art sufficient to render it the virtual equivalent in quality of bread baked in a commercial oven.

12 Claims, 5 Drawing Sheets

STEAMING DEVICE AND SYSTEM FOR RESIDENTIAL OVENS

FIELD OF THE INVENTION

The present invention relates to the field of steam generation for non-commercial ovens, and more particularly to oven inserts that permit residential ovens to emulate commercial hearth ovens through the use of stone tablets as cooking and baking surfaces, and even more particularly to steaming devices inserted proximate to stone tablets in residential ovens to provide a proper, doseable amount of water converting to steam during critical phases of the cooking and backing process to thereby render such residential ovens the equivalent of their commercial hearth conterparts for the production of food material.

BACKGROUND OF THE INVENTION

Commercial ovens provide certain unique attributes that render the end product food material, including, by way of example, breads, pizzas, and other baked goods, of a quality far and away improved over their residential counterparts. Among some of the attributes are thermal control characteristics, materials, dimensions, and overall controls that, if applied to residential ovens, would render them far too expensive and unwieldy.

It has been observed by the inventor herein, that the use of certain materials, like the ceramics or corderites, in certain manner when used in residential ovens improve the characteristics of baking, and hence the byproducts. This invention, however, is not directed to the specific oven insert that can be used for improving the quality of baking. While a component of the process, the instant invention is instead directed to a far more critical component of the baking process—steam.

Steam plays a vital role in commercial hearth ovens in which crusty style breads are baked at relatively hot temperatures approaching 500° F. The introduction of steam into commercial hearth ovens is universal. Steam is introduced generally by the introduction of hot water (sometimes under light pressure) into chambers located on the sides of the commercial hearth oven. These chambers are designed to instantaneously convert the water into steam. Often made from cast iron and loaded with metal, these chambers flood the hearth baking chamber of the oven with steam.

The introduction of steam serves several known purposes. Initially, the steam changes the dry heat atmosphere in the hearth chamber into a moist one. This in turn accomplishes two things. One, the moist steam atmosphere reinvigorates the yeast in the dough. Two, by keeping the surface of the bread dough moist, it allows the bread loaf (in whatever shape it takes) to expand in an aesthetically pleasing way. The steam generated this way prevents the loaves from bursting open in an irregular manner. Concomitantly, the steam filled chamber prevents the crust of the bread from becoming too thick.

In order to accomplish the above, the steam must remain in the hearth oven chamber for between 7 and 10 minutes. After this period the steam dissipates and the atmosphere in the oven becomes dry. This allows the crust of the bread to start the browning process, which is extremely important in imparting taste to the bread.

Often, but not necessarily, steam is reintroduced into the baking chamber during the last stage of the baking process. This aids in the caramelization of the surface of the bread which produces a dark and characteristically tasty surface, which at this stage has permeated into the crust.

Thus, it is observable that steam plays a necessary, indeed critical part in imparting the necessary quality to baked goods, and must be applied in a manner of different ways, at different times, allowing drying times in the between, in order to create a high quality bread or other baked good.

Steam introduction in commercial ovens is known, as shown in, for example, U.S. Pat. No. 6,365,210 B1. Temperature and humidity control in commercial ovens are also known, as shown in, for example, U.S. Pat. No. 6,347,578 B 1. However, heretofore unknown is a device that provides a controlled, doseable, amount of steam to a residential oven thereby providing the virtual equivalent control as that provided in commercial counterparts.

It is therefore an object of the present invention to provide a device for the controlled dosing of water, and hence of steam into a residential oven that will create steam in the chamber, followed by drying (if necessary), thereby rendering the resultant baked goods not simply good, but excellent, as if created in a commercial counterpart.

SUMMARY OF THE INVENTION

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

The foregoing objects and other objects of the invention are achieved through a steamer device and system for a residential oven for creating steam for the purpose of baking having a steamer insert having a bottom surface for resting on a rack in the oven, the steamer insert having, in sequence, a first chamber, a dam device and a second chamber; and the darn device having a metering hole such that when water is added to the first of the two chambers it can only reach, and does reach, the second chamber through the metering hole. The metering hole allows water to trickle from the first chamber (where it is warm but not boiling) to the second chamber where it immediately turns to steam. This is a vast improvement over anything heretofore known in the art, in which a vessel of water is required to reach a boil. This metered dosing permits the addition of water and the immediate creation of steam in the second chamber.

The first and second chambers are angled such that gravity assists in the feeding of water when added from the first chamber through the metering hole to the second chamber. The metering hole is between ⅛ inch and ¹⁄₆₄ inch in diameter, critically to allow the water to flow and immediately steam, as discussed above. Sloped side walls proximately located to the first and second chambers assist in the gravity feed.

Also shown is a system for baking bread, in which the following steps occur: (a) the baking surface stone (like corderite or ceramic) is placed on a first rack in a residential oven; (b) the steamer insert is placed in the oven such that access to the first chamber can occur; (c) the oven is preheated to the optimum temperature (e.g., 410° F. and 475° F.) (and in this manner both the stone and the steamer insert have reached the ambient temperature as well); (d) about ¾ of a cup of water is placed in the first chamber, (e) the bread is then placed on the stone; (f) the oven door is closed. In this manner, the water will trickle through the metering hole into the second chamber, steam the entirety of the oven, the bread will bake, the oven will dry (additional water can thereafter be added for the carmelization effect discussed above), and the bread is allowed to bake for a period of time known to one of ordinary skill in the art sufficient to render it the virtual equivalent in quality of bread baked in a commercial oven.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DESCRIPTION OF THE DRAWINGS

In the drawings, wherein similar reference characters denote similar elements through the several views.

DETAILED DESCRIPTION OF THE PREFERRED EMBODIMENTS

Figure 1:
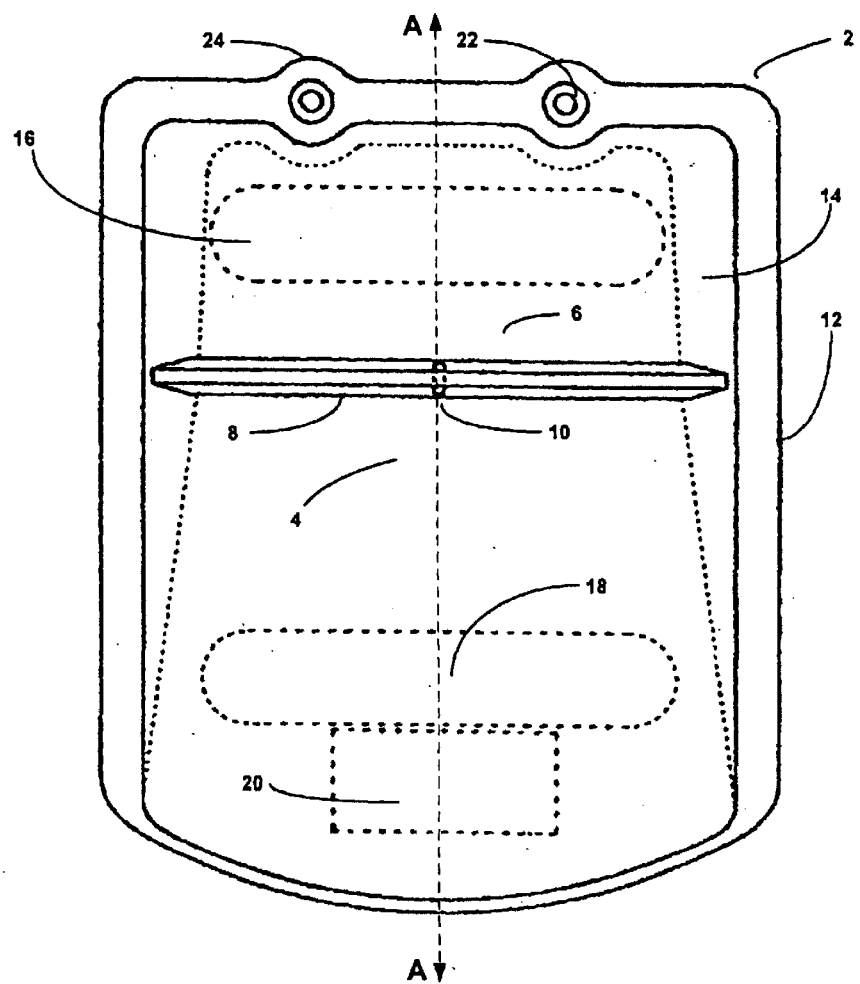
FIG. 1 is a plan top view of a preferred embodiment of the subject invention.

In accordance with the subject invention, FIG. 1 shows a plan, top view of the steamer insert 2 of the subject invention, rendered entirely of iron or other material coated with a Teflon or other material that permits heat conductance, and cleanability. The material is not critical, provided that it provides the thermal characteristics necessary to achieve the functional goals of the invention set forth herein, and thus can be comprised of materials that one of ordinary skill in the art can select, armed with the invention stated herein.

It should be appreciated, that, in use, the residential oven is first raised to the proper temperature for baking. For example, if the baling is of bread, the bread is placed in the oven on a stone insert (corderite, ceramic or other material known to one of ordinary skill in the art), once the optimal temperature of the residential oven has been first raised to between 410° F. and 475° F. The stone insert is typically placed on one rack in the conventional oven. On the rack below, steamer insert 2 is placed. The use and functionality of steamer insert 2 is described in greater detail below.

As shown in FIG. 1, steamer insert 2 has a supporting ridge 12, sloping side walls 14, a rear edge 24, and holes 22. Shown in dotted format are the rear leg 16 (below the device), front leg 18 (below the device), both for supporting the structure. Identification plate insert 20 is also provided for convenience of identifying the device or its manufacture, but otherwise lacks in structural function.

As shown further in FIG. 1, two chambers are present. The first chamber 4 is separated from the second chamber 6 via a dam 8. Dam 8 further contains a metering hole preferably between 1/8 inch and 1/64 inches in diameter. The actual chambers are angled (as shown in further detailed in the subsequent drawings shown below), such that when the device is heated in the oven, water can be added to first chamber 4. The water then flows through metering hole 10 of critical location and size to permit its reaching the second chamber 6. Once the water trickles into the second chamber 6, because the material of steamer insert 2 is already preheated, it immediately turns to steam. Thus, the device creates a meterable, determinable mechanism for steaming the entirety of the chamber of the oven. Indeed, if greater steam is required, more water can be added to first chamber 4, and the metering device of metering hole 10 will prevent the water from either sitting until heated, or immediately steaming. Instead, it will trickle through the metering hole 10 into the second chamber.

In this sense, it is also observable that the device is placed in the oven such that there is easier access to the first chamber 4 (so that water can be added simply without risk of injury to the baker), while the steaming effect is achieved via the metering hole 10 and the resultant trickled water entering second chamber 6.

Figure 2:
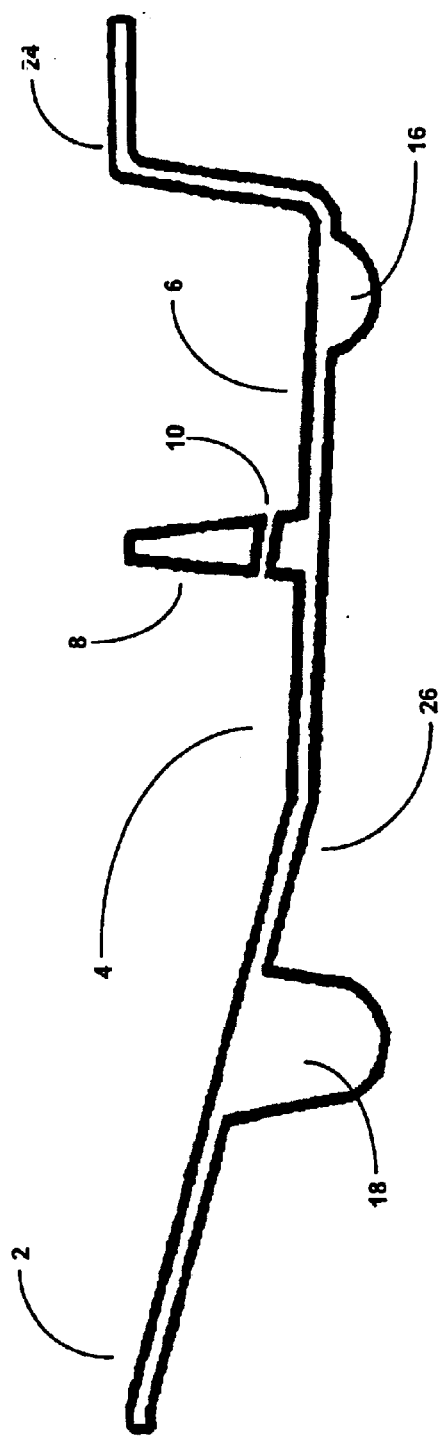
FIG. 2 is a cross-sectional view along line A—A shown in FIG. 1 of the preferred embodiment of the subject invention.

FIG. 2 shows a cross-section of the device shown in FIG. 1, further showing the angle of the device to permit the gravitational motion of the water from the first chamber 4 through the dam 8 and metering hole 10 into the second chamber 6. Rear edge 24 is shown for support, and front leg 18 and rear leg 16 are shown for further support against the rack in the oven. The bottom of the insert 26 of steamer insert 2 is also shown.

Figure 3:
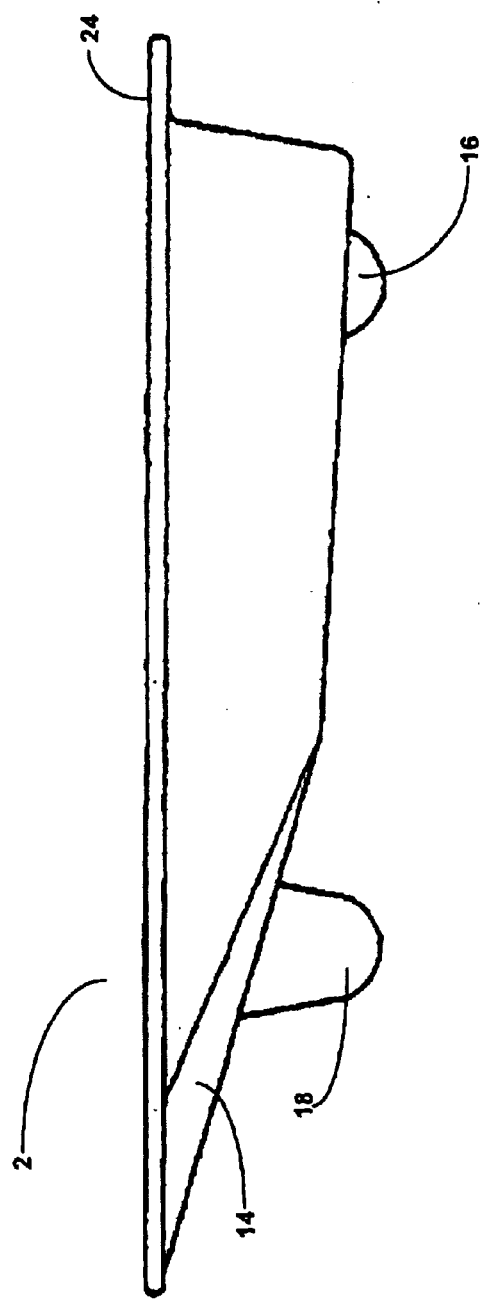
FIG. 3 is a side perspective view of the preferred embodiment of the subject invention.

As shown in FIG. 3, a side view of the device, steamer insert 2 has a sloping side wall 14 (shown in dotted format in FIG. 1) which assist in the gravitational feed of the water from the first chamber 4 to the second chamber 6, as discussed hereinabove. Also shown in FIG. 3 is rear edge 24, and front and rear legs 18 and 16, respectively.

Figure 4:
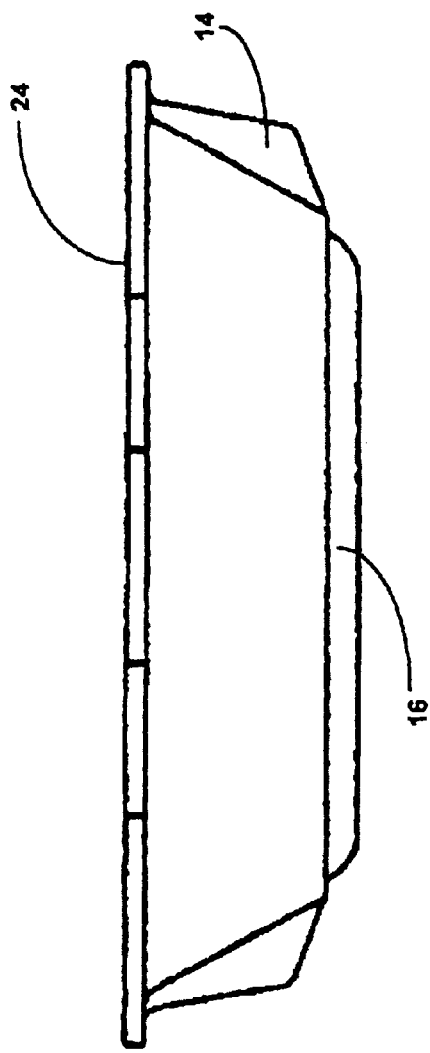
FIG. 4 is a rear perspective view of the preferred embodiment of the subject invention.

FIG. 4 shows the rear view of the steamer insert 2, in which rear edge 24 is shown, as well as the side sloping wall 14 aiding in the gravity feed, as discussed hereinabove. Also shown is rear leg 16.

Figure 5:
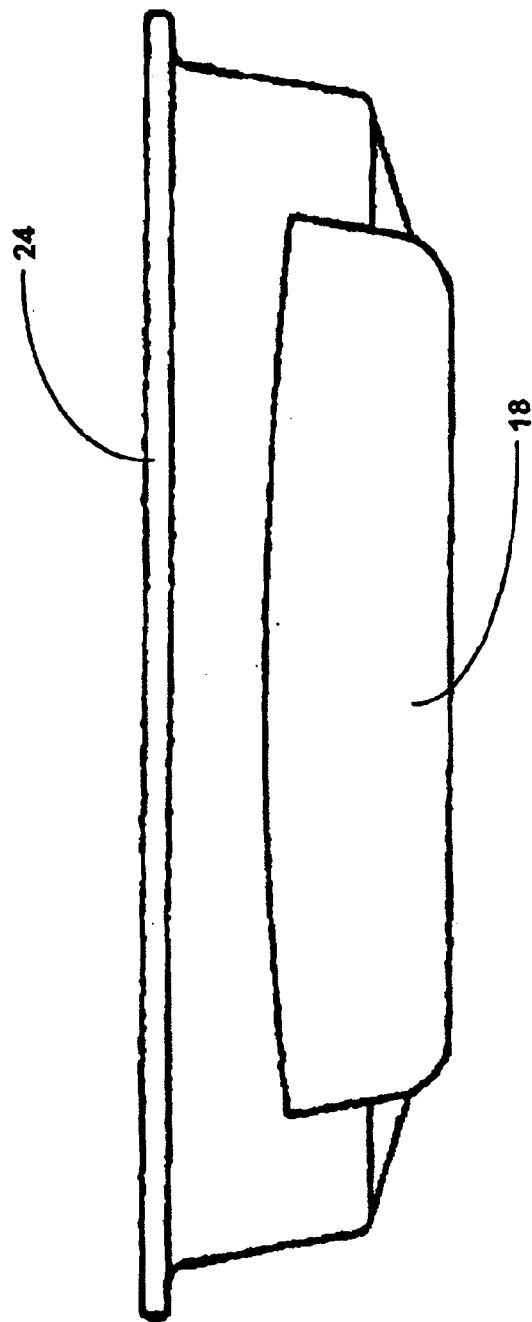
FIG. 5 is a front perspective view of the preferred embodiment of the subject invention.

FIG. 5 shows the front view of the steamer insert 2, in which the rear edge (which circumnavigates the top surface of the device, as observable in the FIG.) 24 is shown, as well as the front leg 18.

In operation of the device as a system, the following steps occur: (a) the baking surface stone (like corderite or ceramic) is placed on a first rack in a residential oven; (b) the steamer insert 2 is placed in the oven such that access to the first chamber 4 can occur; (c) the oven is preheated to the optimum temperature (e.g., 410° F. and 475° F.) (and in this manner both the stone and the steamer insert 2 have reached the ambient temperature as well); (d) about ¾ of a cup of water is placed in the first chamber; (e) the bread is then placed on the stone; (f) the oven door is closed. In this manner, the water will trickle through the metering hole 10 into the second chamber, steam the entirety of the oven, the bread will bake, the oven will dry (additional water can thereafter be added for the carmelization effect discussed above), and the bread is allowed to bake for a period of time known to one of ordinary skill in the art sufficient to render it the virtual equivalent in quality of bread baked in a commercial oven.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

I claim:

1. A device for creating steam for the purpose of baking in a residential oven having at least one rack, comprising:
   (a) a steamer insert having a bottom surface for resting on the at least one rack;
   (b) said steamer insert comprising, in sequence, a first chamber, a dam device and a second chamber; and
   (c) said dam device comprising a metering hole such that when water is added to the first of the two chambers it can only reach, and does reach, the second chamber through said metering hole.

2. The device of claim 1, wherein said bottom surface further comprises at least one leg for resting upon said at least one rack.

3. The device of claim 1, wherein said first and second chambers are angled such that gravity assists in the feeding of water when added from the first chamber through the metering hole to the second chamber.

4. The device of claim 1, wherein the metering hole is between ⅛ inch and 1/64 inch in diameter.

5. The device of claim 1, further comprising sloped side walls proximately located to the first and second chambers.

6. The device of claim 1, wherein said at least one rack is at least two racks one above the other, and wherein the steamer insert is placed upon a rack below the other, and upon the upper rack is placed a stone for the purpose of receiving material for baking.

7. The device of claim 6, wherein said stone is comprised of a material selected from the group consisting of ceramics, corderites and combinations thereof.

8. A device for baking bread with the addition of controlled dosages of steam in a residential oven having at least two racks, comprising:
   (a) a baking stone placed upon one of said at least two racks for receiving the bread;
   (b) a steamer insert placed upon a second of said at least two racks, said steamer insert comprising:
      (1) in sequence, a first chamber, a dam device and a second chamber; and
      (2) said dam device comprising a metering hole such that when water is added to the first of the two chambers it can only reach the second chamber through said metering hole.

9. The device of claim 8, wherein said first and second chambers are angled such that gravity assists in the feeding of water when added from the first chamber through the metering hole to the second chamber.

10. The device of claim 8, wherein the metering hole is between ⅛ inch and 1/64 inch in diameter.

11. The device of claim 1, further comprising sloped side walls proximately located to the first and second chambers.

12. A system for baking bread, comprising the following steps:
   (a) placing a baking surface stone on a first rack in a residential oven;
   (b) placing a steamer insert having at least two chambers separated therebetween by a dam and a metering hole such that water can only flow from the first to the second chamber through said hole;
   (c) preheating said oven to the optimum temperature of between 410° F. and 475° F.) such that the stone and the steamer insert have reached a substantially similar ambient temperature as well;
   (d) adding about ¾ of a cup of water to said first chamber of the steamer insert;
   (e) placing the bread on the stone;
   (f) closing the oven door;
   (g) observing the water trickle through said metering hole into the second chamber;
   (h) steaming virtually the entirety of the oven;
   (i) baking the bread while the steam is present;
   (j) optionally adding additional water for carmelization or other effect; and
   (k) baking the bread for a period of time sufficient to render it of a quality substantially similar to or better than that of bread baked in a conventional oven.

* * * * *